United States Patent [19]
Sebilet

[11] Patent Number: 5,268,926
[45] Date of Patent: Dec. 7, 1993

[54] METHOD AND APPARATUS FOR THE SIMULTANEOUS TRANSMISSION OF SEPARATE DATA SIGNALS

[75] Inventor: Bruno R. Sebilet, Rueil Malmaison, France

[73] Assignee: Societe Nationale d'Etude et de Construction de Moteurs D'Aviation "S.N.E.C.M.A.", Paris, France

[21] Appl. No.: 943,673

[22] Filed: Sep. 11, 1992

[30] Foreign Application Priority Data

Sep. 11, 1991 [FR] France .................. 91 11193

[51] Int. Cl.$^5$ .......................................... H04L 27/30
[52] U.S. Cl. .......................................... 375/1; 380/31; 380/34
[58] Field of Search ................. 375/1; 380/34, 31

[56] References Cited
U.S. PATENT DOCUMENTS 4,653,069 3/1987 Roeder ................................. 380/31
4,943,976 7/1990 Ishigaki ............................... 375/1
5,173,923 12/1992 Crespo et al. ...................... 375/1

FOREIGN PATENT DOCUMENTS 0351008 1/1990 European Pat. Off. .
8302533 7/1983 World Int. Prop. O. .

*Primary Examiner*—Bernarr E. Gregory
*Attorney, Agent, or Firm*—Oblon, Spivak, McClelland, Maier & Neustadt

[57] ABSTRACT

A method of simultaneously transmitting first and second data signals by the technique of spectrum spreading by direct sequence, comprises using the first data signal to modulate a spreading code produced by a code generator from a code clock and using the second data signal to modulate the delay of the spreading code. Modulation of the spreading code delay comprises either modifying the delay of the code delivered by the code generator, or modifying the code clock frequency. Apparatus for carrying out this method is also described.

11 Claims, 4 Drawing Sheets

METHOD AND APPARATUS FOR THE SIMULTANEOUS TRANSMISSION OF SEPARATE DATA SIGNALS

BACKGROUND OF THE INVENTION

1. Field of the invention

The present invention relates a method and apparatus for the simultaneous transmission of two separate data signals using the technique known as spectrum spreading by direct sequence or pseudo-noise.

2. Summary of the prior art

When discreet, confidential and jamming resistant transmission of data is required, it is known to make use of so-called wide-band spectrum spreading techniques. In the case of the direct sequence spreading technique, the useful signal to be transmitted modulates a spreading code in the form of a pseudo-random sequence of binary values, the rate of which is far higher than the band width of the useful signal. On reception, the coded signal received is correlated with a pseudo-random code generated by the receiver, the setting of which enables a synchronizing device to restore the initial useful signal. However, while this technique allows the transmission of any type of variable rate data, whether analog or numerical, it cannot provide for the simultaneous transfer of several data signals without resorting to complex multiplexing techniques and using only one pseudo-random code.

SUMMARY OF THE INVENTION

It is an object of the invention to remedy this drawback by providing a method which makes it possible simply to transmit two separate data signals simultaneously, namely a first and a second data signal, without the need for duplicating the elements which exist in a conventional system using spectrum spreading by direct sequence.

To this end, according to the invention, there is provided a method of simultaneously transmitting data comprising first and second data signals using the technique known as spectrum spreading by direct sequence, including the steps of using said first data signal to modulate a spreading code produced by a code generator from a code clock, and using said second data signal to modulate the delay of said spreading code.

The modulation of the spreading code delay may be effected by modifying the delay in the code delivered by the code generator under the control of the second data signal, or by modifying the frequency of the code clock under the control of the second data signal.

In one embodiment, modifying the delay in the code delivered by said code generator comprises delaying or not delaying said delivered code according to whether said second data signal is in a first state or in a second state.

The invention also provides an apparatus for the simultaneous transmission of data comprising first and second data signals using the technique known as spectrum spreading by direct sequence, comprising at least one transmitter and a receiver, said transmitter including a code generator for producing a spreading code, a code clock for said code generator, means for modulating said spreading code using said first data signal, and means for modulating the delay of said spreading code using said second data signal, and said receiver including means for demodulating said delay in order to restore said second data signal, and means for demodulating said spreading code in order to restore said first data signal.

The delay modulating means may comprise first means for modifying the delay in the spreading code delivered by the code generator under the control of the second data signal, or second means for modifying the frequency of the code clock, preferably constituted by a voltage controlled oscillator, under the control of the second data signal.

In one embodiment, the delay modulating means comprises a two-position switch which, under the control of a two-state second data signal, delivers the spreading code in a delayed or undelayed form according to the state of the second data signal.

Preferably the receiver further includes a code generator for producing a spreading code, and a voltage controlled oscillator forming a code clock for said code generator, and said delay demodulating means comprises a correlator which measures the delay between the coded data signal received by said receiver and the spreading code generated by said code generator, said delay measurement being used to control said voltage controlled oscillator.

In a particular embodiment, the transmitter comprises a first voltage controlled oscillator constituting said code clock and controlled by said first data signal, a first frequency multiplier/divider receiving the output from said first oscillator and also receiving said second data signal to provide a transmission carrier which is frequency modulated by said second data signal, a second frequency multiplier/divider through which the output from said first oscillator is also supplied to said code generator, and a first modulator which modulates said transmission carrier by said spreading code generated by said code generator to provide the coded data signal for transmission, and said receiver comprises a second code generator for producing the spreading code, a second voltage controlled oscillator constituting a code clock for said second code generator, third and fourth frequency multiplier/dividers each receiving the output from said second oscillator, said third frequency multiplier/ divider providing a reception carrier, and said fourth frequency multiplier/divider providing the input to said second code generator, a second modulator which modulates said reception carrier by said spreading code produced by said second code generator, a correlator which measures the delay between the coded data signal received from said transmitter and said modulated reception carrier to restore said first data signal and to control said second oscillator, a comparator for comparing said received coded data signal with said modulated reception carrier delivered by said second modulator, and a demodulator for frequency demodulating the output from said comparator to restore said second data signal.

Further features and advantages of the invention will become apparent from the following description of the preferred embodiments, given by way of example only, with reference to the accompanying drawings.

DESCRIPTION OF THE PREFERRED EMBODIMENTS

Figure 1:
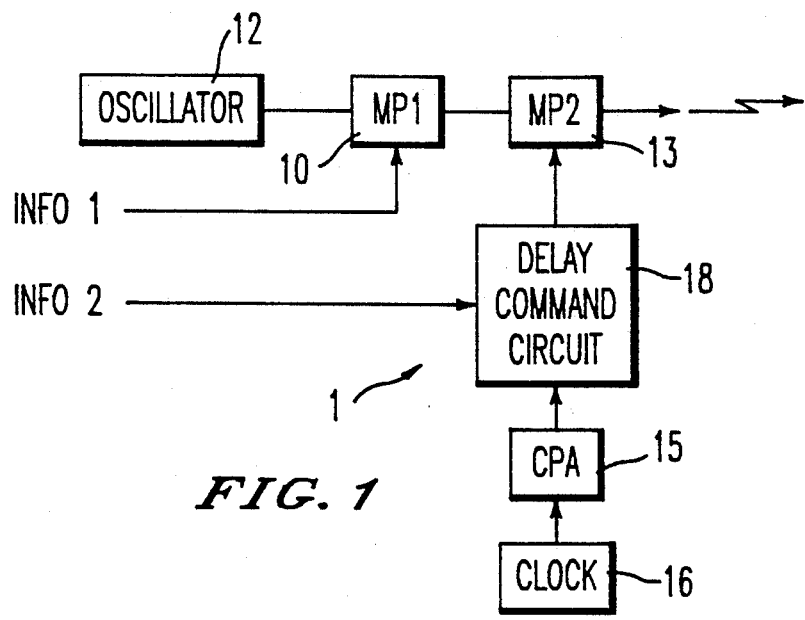
FIG. 1 is a block diagram of a first embodiment of a transmitter for carrying out the method in accordance with the invention.

The communication systems which are shown in the drawings each comprise at least one transmitter and at least one receiver, the transmission and reception of signals being performed radioelectrically.

FIGS. 1 to 4 illustrate a first embodiment in which a second data signal is transmitted by controlling the delay of the spreading code modulated by a first data signal.

The transmitter 1 is shown in FIG. 1 and comprises a first modulator 10 which receives a first low band data signal 11 constituting a useful signal to be transmitted in order to modulate a radioelectrical carrier generated by a first oscillator 12, and a second modulator 13 which generates the final coded data signal 14 for transmission, the second modulator 13 operating to modulate the modulated data from the first modulator 10 by a spreading code, preferably consisting of a pseudo-random binary sequence, produced by a code generator 15 driven by a clock 16.

The modulators 10 and 13 are preferably of the type having two-phase states (MP2), but frequency or differential phase modulation could equally well be used, as may also an all or nothing amplitude modulation system.

A second low band data signal 17, which constitutes a useful signal which is to be transmitted simultaneously with the first data signal 11, is applied independently of the first data signal to the output of the spreading code in order to modify the delay 18 of this code in proportion to the value of the data.

Figure 2:
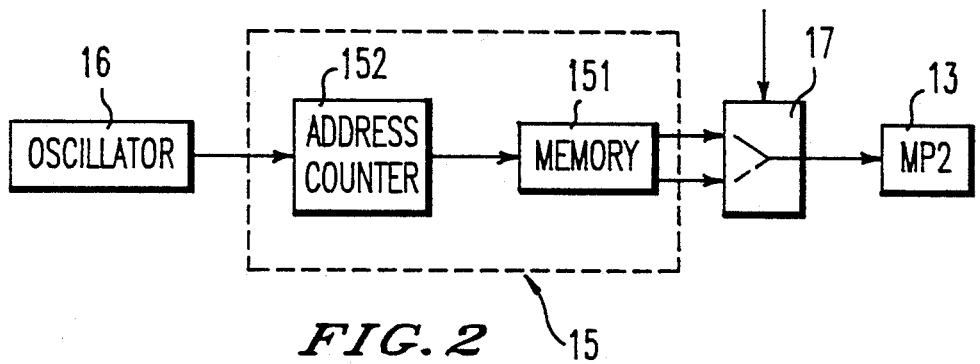
FIG. 2 shows the elements of the transmitter of FIG. 1 relating to transmission of the second data signal.

This modification of the delay in the code delivered by the code generator 15 under the control of the second data signal 17 may be carried out simply by a two-position switch 100 as shown in FIG. 2. In this case the code generator 15 is constituted by a memory 151 which contains two versions of the pseudo-random code offset for example by 1 bit, and an address counter 152 which allows all of the memory to be scanned. At the output of the memory there is at any given moment a code bit and an offset code bit, these two bits constituting the two inputs of the two-position switch 100 controlled by the second data signal 17 to be transmitted, and the output of the switch 100 constitutes the modulating signal of the second modulator 13. In this embodiment, the data to be transmitted is a two-state data signal but it is entirely possible, by replacing the two-position switch 100 by a multiplexer, to provide a spreading code which is modulated by a multi-state data signal as the input to the modulator 13.

Figure 3:
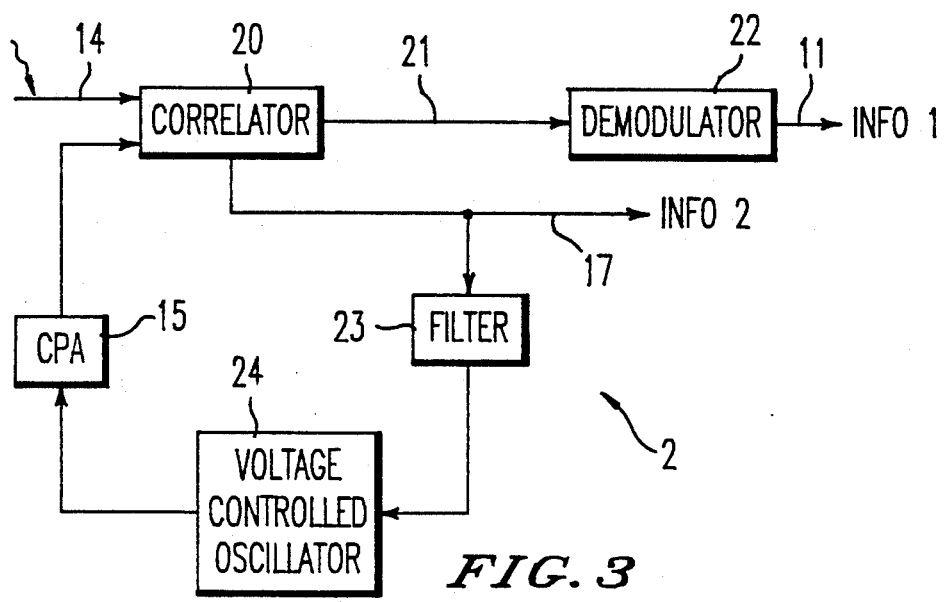
FIG. 3 is a block diagram of a receiver adapted to be used with the transmitter of FIG. 1.

FIG. 3 shows a receiver 2 for use with the transmitter of FIG. 1. The receiver 3 comprises a correlator 20 which compares the coded data signal 14 received from the transmitter 1 with the spreading code from the code generator 15, and a demodulator 22 which restores the first low band data signal 11. The second low band data signal 17 is restored by measurement of the delay at the output from the correlator 20, this measurement being filtered at 23 to provide the input of a voltage controlled oscillator 24 which acts on the code generator 15 to bring the delay in the spreading code generated in the receiver 2 under the control of the coded data signal 14 which is received. To a certain extent, the assembly constitutes a delay locking loop which, to allow effective demodulation of the second low band data signal 17, has to possess a smaller pass band than that of the second data signal.

Figure 4:
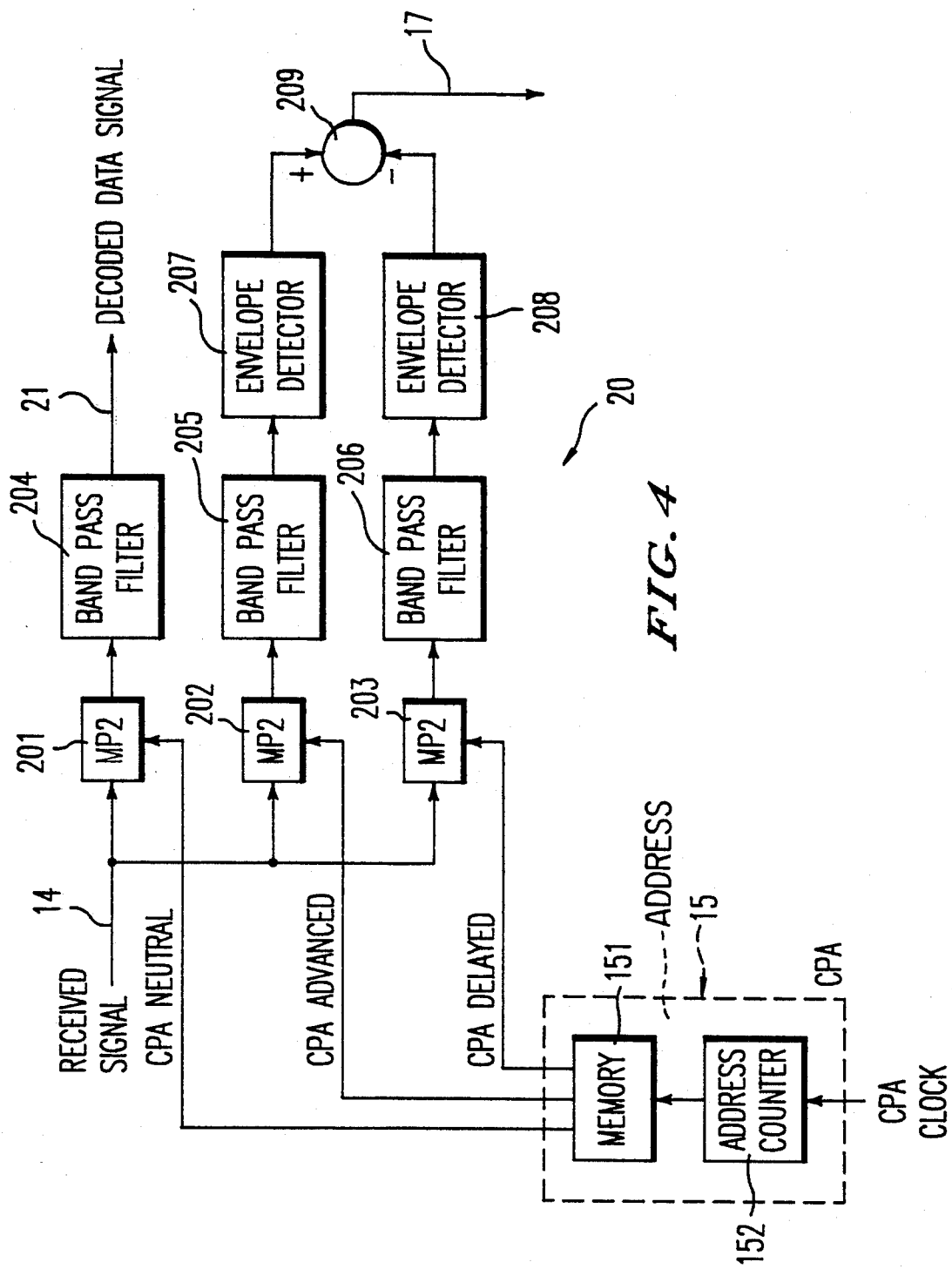
FIG. 4 is a block diagram of a correlator which may be used in the receiver of FIG. 3.

FIG. 4 shows the correlator 20 in greater detail. It consists of three modulators 201,202,203 each receiving the coded data signal 14 and respectively controlled by identical spreading codes generated by the code generator 15 but offset from each other by 1 bit. This offset is not obligatory, any offset between 0 and 2 being equally possible.

As in the case of the transmitter 1, the code generator 15 comprises a memory 151 and an address counter 152. Band pass filters 205,206 are disposed at the outputs of the modulators 202,203 respectively and are followed by envelope detectors 207,208 and a summation point 209 to yield, when the maximum of the correlation function between these two signals is achieved, a measurement of the delay between the received coded data signal 14 and the spreading code provided by the code generator 15.

At this instant, the first modulator 201, which receives the centred spreading code while the two other modulators 202 and 203 receive the same code but with one advanced and the other delayed, delivers via a filter 204 a decoded data signal 21 for supply to the demodulator 22 which restores the initial data, that is to say the first data signal 11.

Figure 5:
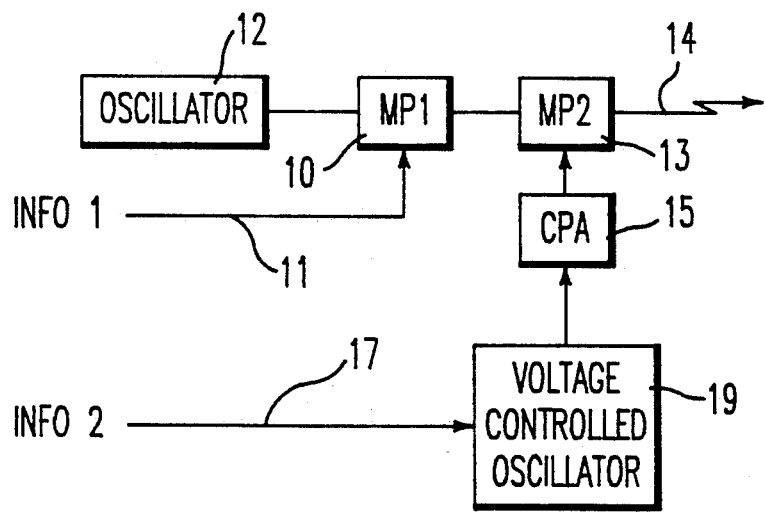
FIG. 5 is a diagram of a second embodiment of a transmitter for carrying out the method in accordance with the invention.
Figure 6:
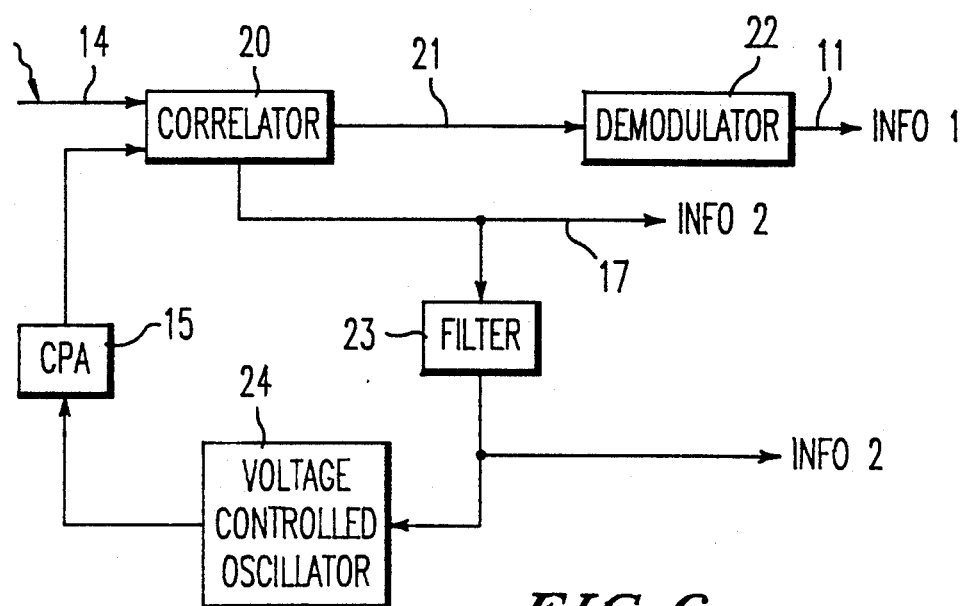
FIG. 6 is a diagram of a receiver adapted to be used with the transmitter of FIG. 5.

FIGS. 5 and 6 illustrate a second embodiment in which the second data signal is transmitted by varying the spreading code delay, modulated by the first data signal, through the control of a voltage controlled oscillator (VCO).

FIG. 5 shows the transmitter of this embodiment, the elements which are common to the first embodiment being identified by the same reference numerals. The transmitter thus comprises a first modulator 10 which receives the first low band data signal 11 in order to modulate a radioelectrical carrier generated by the first oscillator 12, and a second modulator 13 which generates the coded data signal 14 for transmission by modulation of the modulated data delivered from the first modulator 10 by a spreading code produced by the code generator 15. As before, the modulators 10 and 13 are preferably of the type having two phase states (MP2). The second low band data signal 17, which is to be transmitted simultaneously with the first data signal 11, constitutes the command input of a voltage controlled oscillator 19 and thus modifies the frequency of the code clock delivered at the output of the oscillator 19. Thus, a delay is obtained which is proportional to the integral of the value of the second data signal 17, rather than proportional to the data as in the first embodiment.

FIG. 6 shows a receiver for use with the transmitter in FIG. 5. It is similar in construction to that shown in FIG. 3, with a correlator 20 and a demodulator 22 which restores the first low band data signal 11, and a delay locking loop which demodulates the second low band data signal 17. In this case, however, the demodulated second signal 17 is obtained at the input of the voltage controlled oscillator 24 rather than at the output of the correlator 20, and for effective operation the delay locking loop must have a pass band greater than that of the second data signal.

Figure 7A:
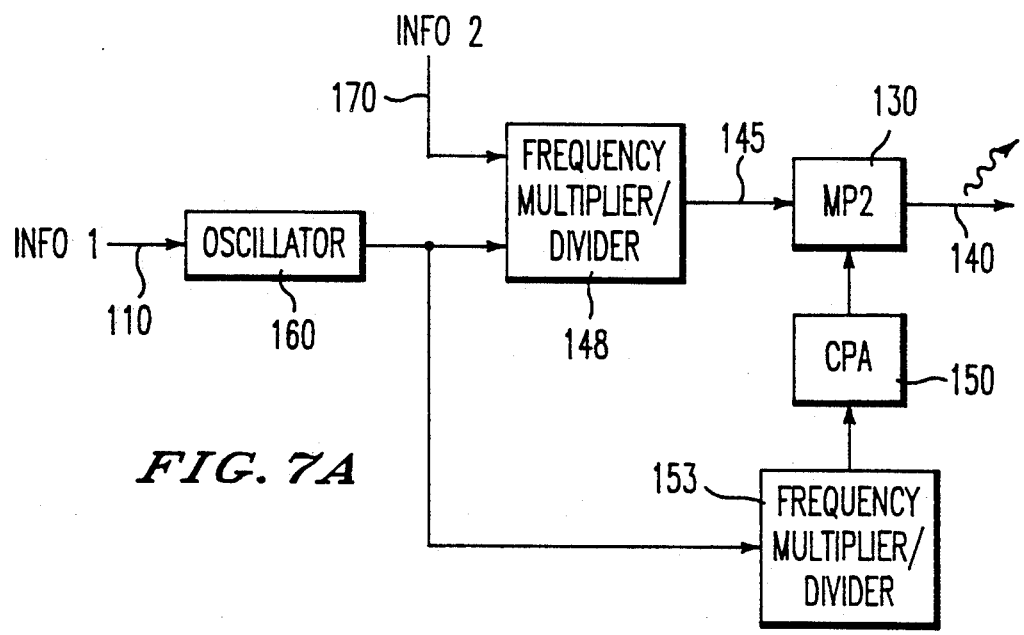
FIG. 7 is a diagram of a third embodiment of a transmitter-receiver assembly which functions in accordance with the invention.
Figure 7B:
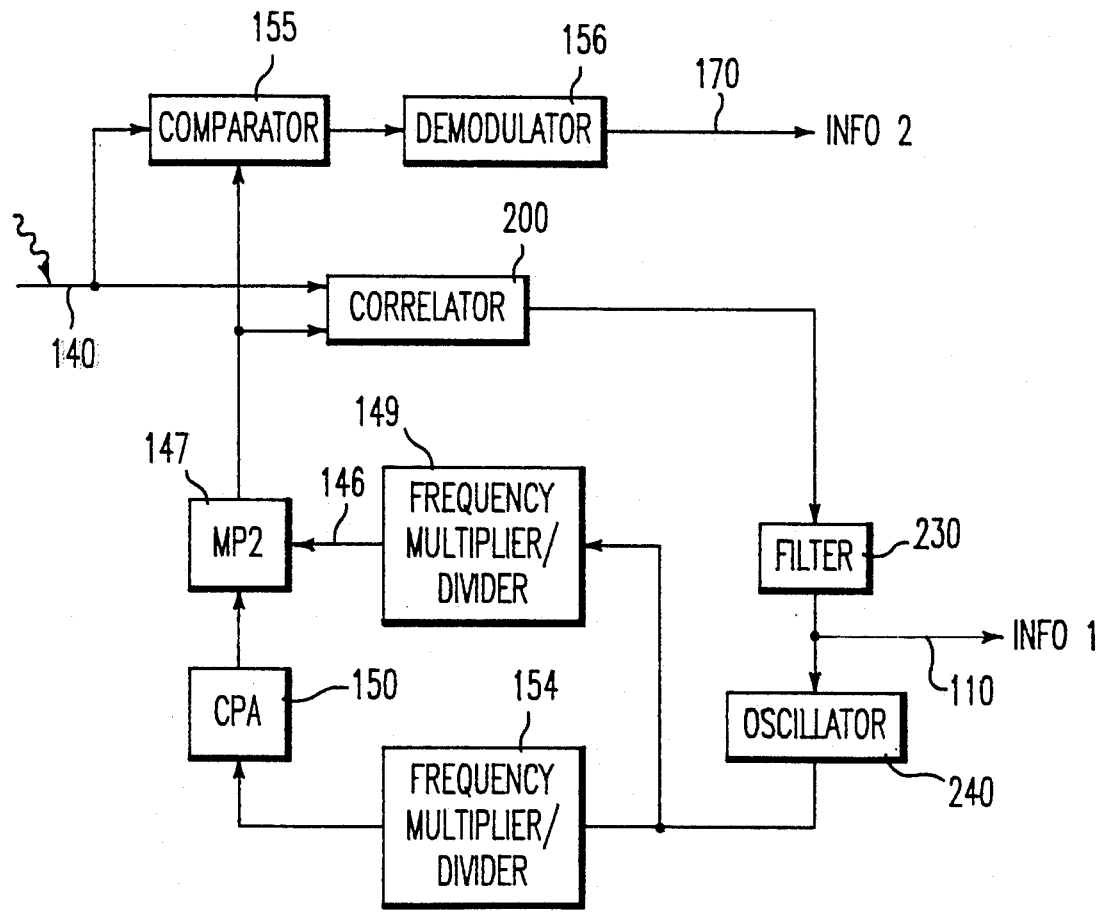

FIG. 7 shows a third embodiment in which the transmitter and the receiver are coherent, that is to say for which the radioelectrical carrier and the spreading code clock are produced from a single oscillator. In this case, in order to carry out simultaneous transmission of two separate data signals, it is possible to resort to combined modulation. The drawing illustrates the non-limitative case of a first data signal 110 transmitted using a delay variation modulation of the type used in the embodiment of FIGS. 5 and 6, and a second data signal 170 transmitted using frequency modulation. A combination of delay control modulation of the type used in the embodiment of FIGS. 1 to 4 and phase modulation may also be envisaged without any difficulty.

The transmitter comprises a first modulator 130 which generates a coded data signal 140 for transmission by modulation of a transmission carrier 145 by a spreading code produced by a code generator 150. The transmission carrier and the spreading code are issued by respective frequency multiplier/dividers 148,153, each of which receives the output from a first single oscillator 160 which is voltage controlled by the first low band data signal 110. This variable control of the oscillator 160 causes a variation in the delay (delay modulation) of the spreading code resembling that previously described with reference to FIG. 5, and also a variation in the frequency of the transmission carrier 145. The second low band data signal 170 forms a second input to the frequency multiplier/divider 148 and also produces frequency modulation of the transmission carrier 145.

The coded signal 140 which is transmitted therefore comprises a carrier which is frequency modulated by the second data signal 170 and delay modulated, and which is also frequency modulated by the first data signal 110. At the receiver, a correlator 200 and filter 230 delivers the restored first data signal 110 by measuring the delay between the received coded data signal 140 and a reception carrier 146 modulated in a second modulator 147 by the spreading code generated by the code generator 150, the code clock of which is furnished by a second voltage controlled oscillator 240 controlled by the delay measurement data from the correlator 200. This oscillator 240 constitutes a single reference for the reception carrier 146 and the code generator 150 via respective frequency multiplier/dividers 149,154. The restored second data signal 170 is obtained by a frequency demodulator 156 acting on the output from a comparator 155 which receives the received coded data signal 140 and the signal furnished at the output from the second modulator 147, this signal being nothing more than a carrier modulated in terms of delay and frequency by the restored first data signal 110 at the input of the voltage controlled oscillator 240.

The above described embodiments show rather well the diversity of the possibilities afforded by the present invention, and a man skilled in the art may envisage other embodiments without departing from the scope of the invention, the range of application of which is very general, whether it relates to transmission between moving bodies or more simply to transmission between data components for example.

I claim:

1. A method for transmitting data, comprising the steps of:
    generating an oscillating signal;
    modulating the oscillating signal by a first data signal, to generate a first modulated signal;
    modulating the first modulated signal by a spreading code generated by a code generator driven by a code clock; and
    modulating a delay of the spreading code by a second data signal.

2. The method according to claim 1, wherein said step of modulating the delay of said spreading code comprises modifying the delay in the spreading code generated by said code generator under control of said second data signal.

3. The method according to claim 2, wherein said step of modifying the delay in the spreading code generated by said code generator comprises delaying or not delaying said generated spreading code according to whether said second data signal is in a first state or in a second state.

4. The method according to claim 1, wherein said step of modulating the delay of said spreading code comprises modifying a frequency of said code clock under control of said second data signal.

5. An apparatus for transmitting and receiving data, the apparatus comprising:
    at least one transmitter, each transmitter comprising:
        an oscillator for generating an oscillating signal;
        a first modulator for modulating the oscillating signal by a first data signal for generating a first modulated signal
        a second modulator for modulating the first modulated signal by a spreading code generated by a first code generator driven by a code clock; and
        means for modulating a delay of the spreading code by a second data signal, to generate a coded data signal for transmission;
    at least one receiver for receiving the coded data signal from the at least one transmitter, each receiver comprising:
        means for demodulating the delay to restore the second data signal; and
        means for demodulating the spreading code to restore the first data signal.

6. The apparatus according to claim 5, wherein said means for modulating the delay comprises means for modifying the delay in the spreading code generated by said first code generator under control of said second data signal.

7. The apparatus according to claim 6, wherein said means for modifying the delay means comprises a two position switch which, under control of a two-state second data signal, delivers said spreading code in a delayed or undelayed form according to a state of said second data signal.

8. The apparatus according to claim 5, wherein said means for modulating the delay comprises means for modifying a frequency of said code clock under control of said second data signal.

9. The apparatus according to claim 8, wherein said code clock comprises a voltage controlled oscillator, and said second data signal controls a voltage of said voltage controlled oscillator to modify the frequency of said code clock.

10. The apparatus according to claim 5, wherein the means for demodulating the spreading code comprises:

a second code generator for generating the spreading code;

a voltage controlled oscillator for generating the code clock for said second code generator;

a correlator for measuring a delay between the coded data signal received by said receiver and the spreading code generated by said second code generator, said delay measurement being used to control said voltage controlled oscillator.

11. An apparatus for transmitting and receiving data, the apparatus comprising:

at least one transmitter, each transmitter comprising:

a first oscillator for generating a first oscillating signal controlled by a first data signal;

a first frequency multiplier/divider for receiving the first oscillating signal from the first oscillator and for also receiving a second data signal to provide a transmission carrier which is frequency modulated by the second data signal;

a second frequency multiplier/divider for also receiving the first oscillating signal from the first oscillator;

a first code generator for receiving an output from the second frequency multiplier/divider and for generating a spreading code;

a first modulator for modulating the transmission carrier provided by the first frequency multiplier/divider by the spreading code generated by the first code generator, to generate a coded data signal for transmission;

at least one receiver for receiving the coded data signal from the at least one transmitter, each receiver comprising:

a second code generator for generating the spreading code;

a second oscillator for generating a second oscillating signal constituting the code clock for the second code generator;

third and fourth frequency multiplier/dividers each receiving the second oscillating signal from the second oscillator, the third frequency multiplier/divider providing a reception carrier and the fourth frequency multiplier/divider providing the code clock to the second code generator;

a second modulator for modulating the reception carrier output from the third frequency multiplier/divider by the spreading code output from the second code generator to generate a modulated reception carrier;

a correlator for measuring a delay between the coded data signal received from the at least one transmitter and the modulated reception carrier to restore the first data signal and to control the second oscillator;

a comparator for comparing the coded data signal received from the at least one transmitter with the modulated reception carrier; and a demodulator for outputting a comparison signal and frequency demodulating the comparison signal output by the comparator to restore the second data signal.

* * * * *